United States Patent
Vasseur et al.

(10) Patent No.: US 8,279,749 B2
(45) Date of Patent: Oct. 2, 2012

(54) FAILURE PROTECTION FOR P2MP TUNNEL HEAD-END NODE

(75) Inventors: Jean-Philippe Vasseur, Dunstable, MA (US); Alton Lo, Fremont, CA (US); Mohammed Azhar Sayeed, Shrewsbury, MA (US)

(73) Assignee: Cisco Technology, Inc., San Jose, CA (US)

(*) Notice: Subject to any disclaimer, the term of this patent is extended or adjusted under 35 U.S.C. 154(b) by 1129 days.

(21) Appl. No.: 11/604,605

(22) Filed: Nov. 27, 2006

(65) Prior Publication Data

US 2008/0123524 A1    May 29, 2008

(51) Int. Cl.
*G01R 31/08* (2006.01)
(52) U.S. Cl. ....................... 370/217; 370/400
(58) Field of Classification Search .................. 370/217, 370/228, 400, 503; 714/4, 43, 56, 48
See application file for complete search history.

(56) References Cited

U.S. PATENT DOCUMENTS

| | | | |
|---|---|---|---|
| 6,262,997 B1* | 7/2001 | Quayle ....................... | 370/503 |
| 6,778,492 B2 | 8/2004 | Charny et al. | |
| 6,978,394 B1 | 12/2005 | Charny et al. | |
| 7,054,262 B2 | 5/2006 | Gerstel | |
| 7,099,286 B1 | 8/2006 | Swallow | |
| 7,120,151 B1 | 10/2006 | Ginjpalli et al. | |
| 2003/0126287 A1 | 7/2003 | Charny et al. | |
| 2003/0233595 A1 | 12/2003 | Charny et al. | |
| 2005/0083928 A1 | 4/2005 | Sivabalan et al. | |
| 2005/0111351 A1* | 5/2005 | Shen ............................ | 370/217 |
| 2007/0047556 A1* | 3/2007 | Raahemi et al. .......... | 370/395.53 |
| 2008/0049763 A1* | 2/2008 | Damm et al. .................. | 370/400 |
| 2008/0107017 A1* | 5/2008 | Yuan et al. .................... | 370/228 |

OTHER PUBLICATIONS

Awduche, D. et al., Request for Comments 3209, entitled "RSVP-TE: Extensions to RSVP for LSP Tunnels", Network Working Group, IETF, Dec. 2001, pp. 1-57.
Smit, H. et al., Request for Comments 3784, entitled "Intermediate System to Intermediate System (IS-IS) Extensions for Traffic Engineering (TE)", Network Working Group, IETF, Jun. 2004, pp. 1-13.
Katz, D. et al., Request for Comments 3630, entitled "Traffic Engineering (TE) Extensions to OSPF Version 2", Network Working Group, IETF, Sep. 2003, pp. 1-14.
Berger, L., Request for Comments 3473, entitled "Generalized Multi-Protocol Label Switching (GMPLS) Signaling Resource ReserVation Protocol-Traffic Engineering (RSVP-TE) Extensions", Network Working Group, IETF, Jan. 2003, pp. 1-40.
Braden, R. et al., Request for Comments 2205, entitled "Resource ReSerVation Protocol (RSVP)—Version 1 Functional Specification", Network Working Group, IETF, Sep. 1997, pp. 1-105.
Vasseur, JP. et al., Internet-Draft, entitled "Path Computation Element (PCE) Communication Protocol (PCEP)—Version 1 (draft-ietf-pce-pcep-03.txt)", Network Working Group, IETF, Oct. 2006, pp. 1-61.

* cited by examiner

*Primary Examiner* — David Oveissi
(74) *Attorney, Agent, or Firm* — Cesari and McKenna, LLP (57) ABSTRACT

In one embodiment, a primary head-end node (PHE) and one or more backup head-end nodes (BHEs) receive traffic from a common multicast network. The PHE establishes a primary point-to-multipoint (P2MP) tunnel and forwards the multicast traffic onto the primary P2MP tunnel. The PHE then notifies a selected BHE of one or more characteristics of the primary P2MP tunnel, and the selected BHE establishes a backup P2MP tunnel with the characteristics of the primary P2MP tunnel. In response to detecting a failure of the PHE, the BHE initiates forwarding of the multicast traffic onto the backup P2MP tunnel.

22 Claims, 7 Drawing Sheets

FAILURE PROTECTION FOR P2MP TUNNEL HEAD-END NODE

TECHNICAL FIELD

The present disclosure relates generally to computer networks, and, more particularly, to head-end node protection of point-to-multipoint (P2MP) tunnels.

BACKGROUND

Several service providers, such as those providing multicast services, e.g., Video over Internet Protocol (VoIP), IP television (IPTV), etc., deliver multicast content from one or more head-end nodes (e.g., Points of Presence, or POPs) to one or more tail end nodes (e.g., several tail-end nodes per head-end node) over a point-to-multipoint (P2MP) tunnel. In one scenario, the head-end node receives the multicast traffic from a multicast network and transmits the multicast traffic onto the P2MP tunnel. Also, the tail-end node receives the tunneled traffic, and forwards the received traffic to another multicast network located at the tail-end node, for example, to reach end-user devices (client televisions, etc.). Notably, the P2MP tunnel, e.g., established using Multiprotocol Label Switching (MPLS) Traffic Engineering (TE), offers a tunnel connection through the service provider's (and others') network, which, as those skilled in the art will understand, allows for various tunnel advantages to be achieved through the network, such as bandwidth reservation, etc.

One particular benefit of a tunnel is its ability to provide "Fast Reroute" (FRR) functionality to protect against intermediate node failure along a primary tunnel. That is, an FRR backup tunnel may be established to protect one or more nodes (or links) along the primary tunnel and, in the event the node (or link) fails, the point of local repair (PLR) quickly reroutes the primary tunnel traffic onto the backup tunnel to circumvent the failed element. However, because the FRR backup tunnel generally needs to intersect the primary tunnel (i.e., the backup tunnel generally starts and ends at the primary tunnel), failure protection is generally not available to a head-end node and a tail-end node of the tunnel.

For instance, for P2MP tunnels receiving multicast traffic, in the event that a head-end node of a primary P2MP tunnel fails, then a backup head-end node is configured to rerouted the multicast traffic onto a corresponding backup P2MP tunnel. This process may require cumbersome configuration (e.g., manual configuration) to determine the backup head-end node that may be suitable to assume the responsibility of the failed head-end node. Particularly, the backup P2MP tunnel has generally already been established (i.e., prior to failure) from the backup head-end node to each of one or more tail-end nodes originally receiving tunnel traffic from the failed head-end node. In addition, the primary and backup (and other possible backup) P2MP tunnels from the multicast network to the tail-end nodes inefficiently reserve resources (e.g., bandwidth) since the tunnels are computed separately, without consideration for shared resources (i.e., where the primary and backup tunnels utilize the same links/nodes).

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a primary head-end node (PHE) and one or more backup head-end nodes (BHEs) receive traffic from a common multicast network. The PHE establishes a primary point-to-multipoint (P2MP) tunnel and forwards the multicast traffic onto the primary P2MP tunnel. The PHE then notifies a selected BHE of one or more characteristics of the primary P2MP tunnel, and the selected BHE establishes a backup P2MP tunnel with the characteristics of the primary P2MP tunnel. In response to detecting a failure of the PHE, the BHE initiates forwarding of the multicast traffic onto the backup P2MP tunnel.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
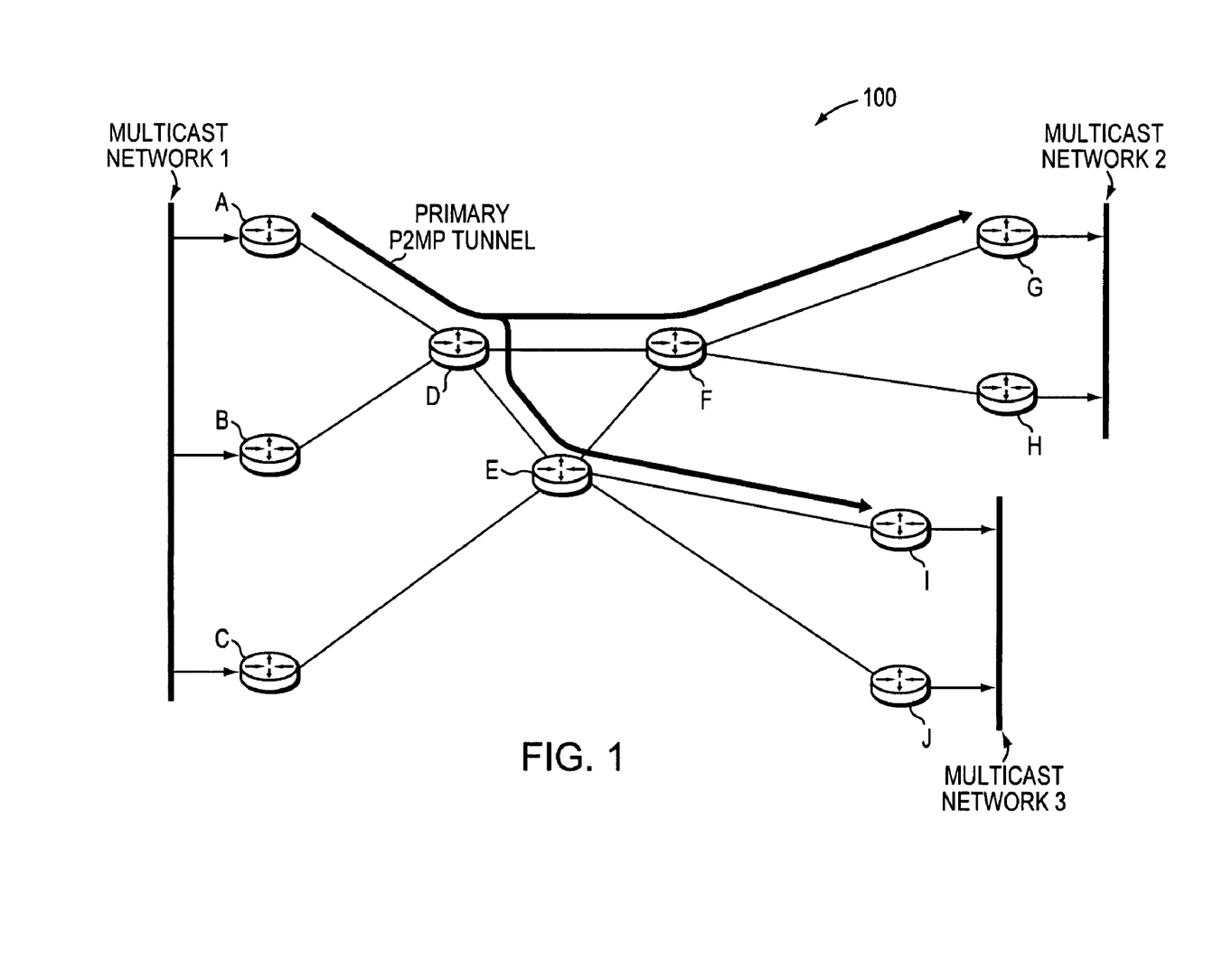
FIG. 1 illustrates an example computer network.

FIG. 1 is a schematic block diagram of an example computer network 100 illustratively comprising nodes (e.g., routers) A-J interconnected by links as shown. Illustratively, nodes A-C are interconnected with a first multicast network "multicast 1" (e.g., a LAN), nodes G-H are interconnected with a second multicast network "multicast 2", and nodes I-J are interconnected with a third multicast network "multicast 3". Those skilled in the art will understand that any number of nodes, routers, links, etc. may be used in the computer network and interconnected in any manner, and that the view shown herein is for simplicity. Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
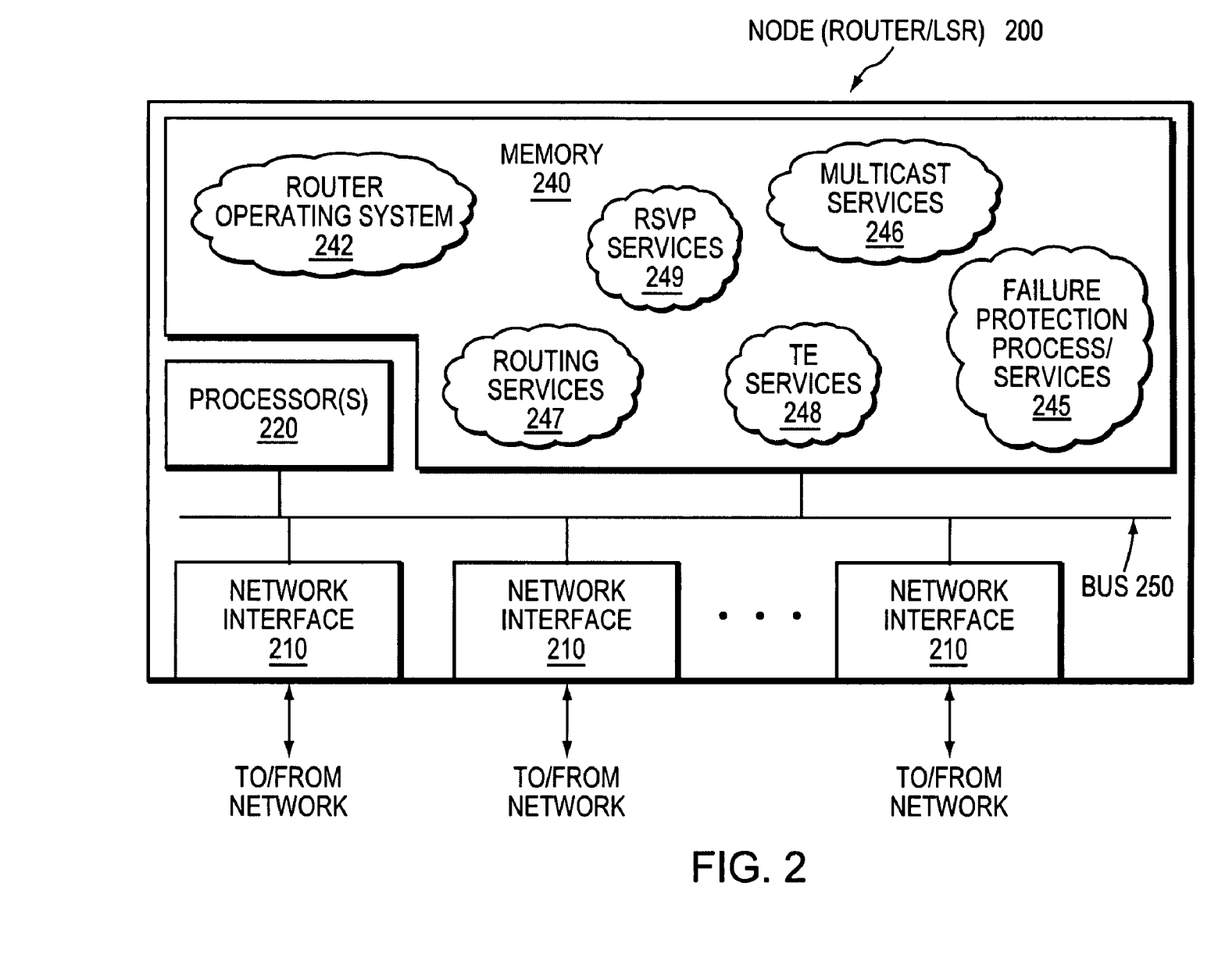
FIG. 2 illustrates an example node/router.

FIG. 2 is a schematic block diagram of an example node/router 200 that may be advantageously used with one or more embodiments described herein, e.g., as a head-end node (label switched router, "LSR"). The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures. A router operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247, Resource ReSerVation Protocol (RSVP) services 249, Traffic Engineering (TE) services 248, multicast services 246, and as described herein, a failure protection service/process 245 (e.g., a head-end node failure protection process). It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Changes in the network topology within the local domain (network 100) may be communicated among routers 200 within the network 100 using IGP services, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
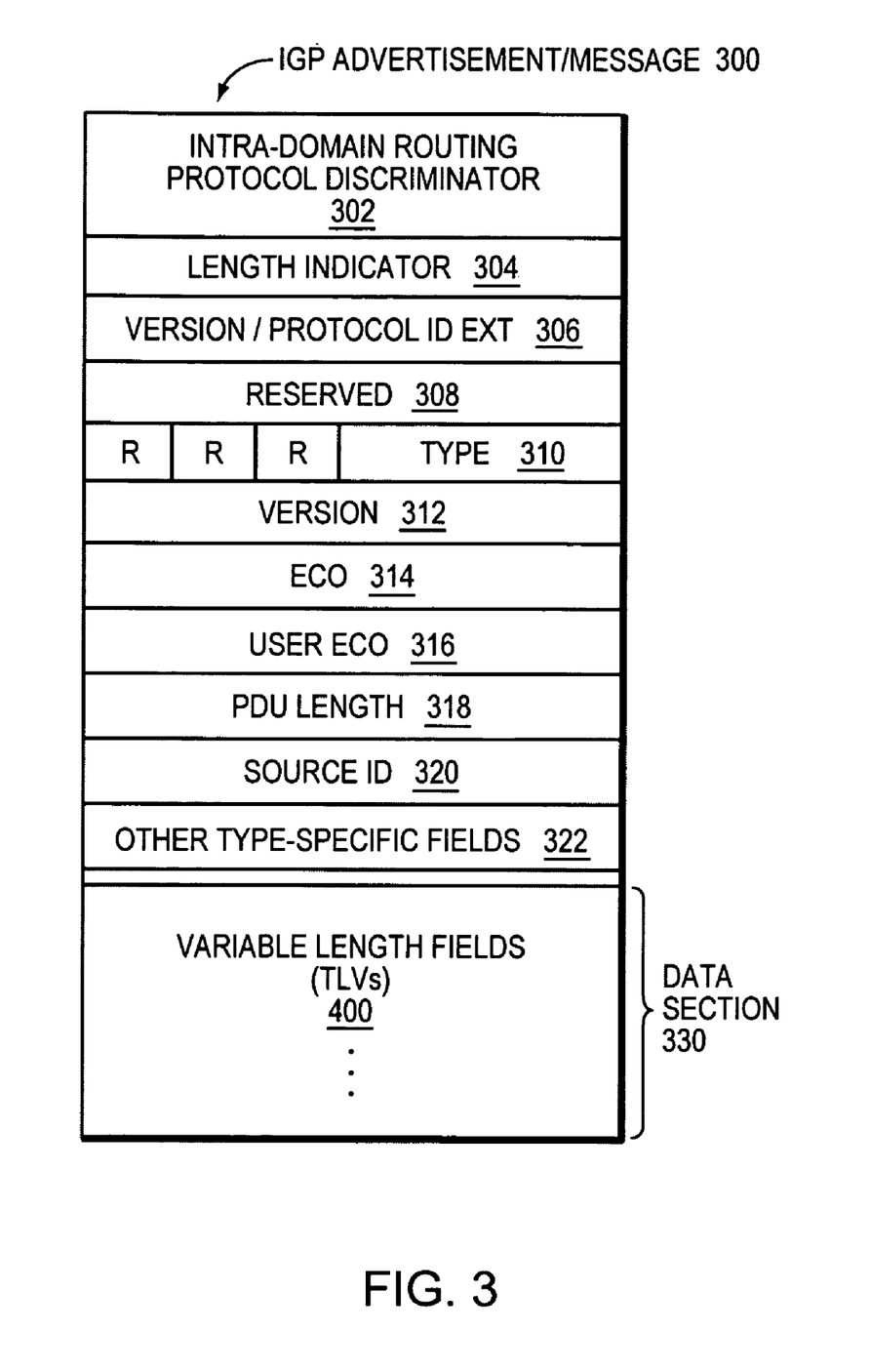
FIG. 3 illustrates an example IGP advertisement.

FIG. 3 illustrates an example IGP advertisement 300 that may be flooded by the routers 200. Illustratively, IGP advertisement 300 is shown as an IS-IS link state packet. Those skilled in the art will understand, however, that other IGP advertisements may be used in accordance with the one or more embodiments described herein, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a link state packet, a "Hello" packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

Figure 4:
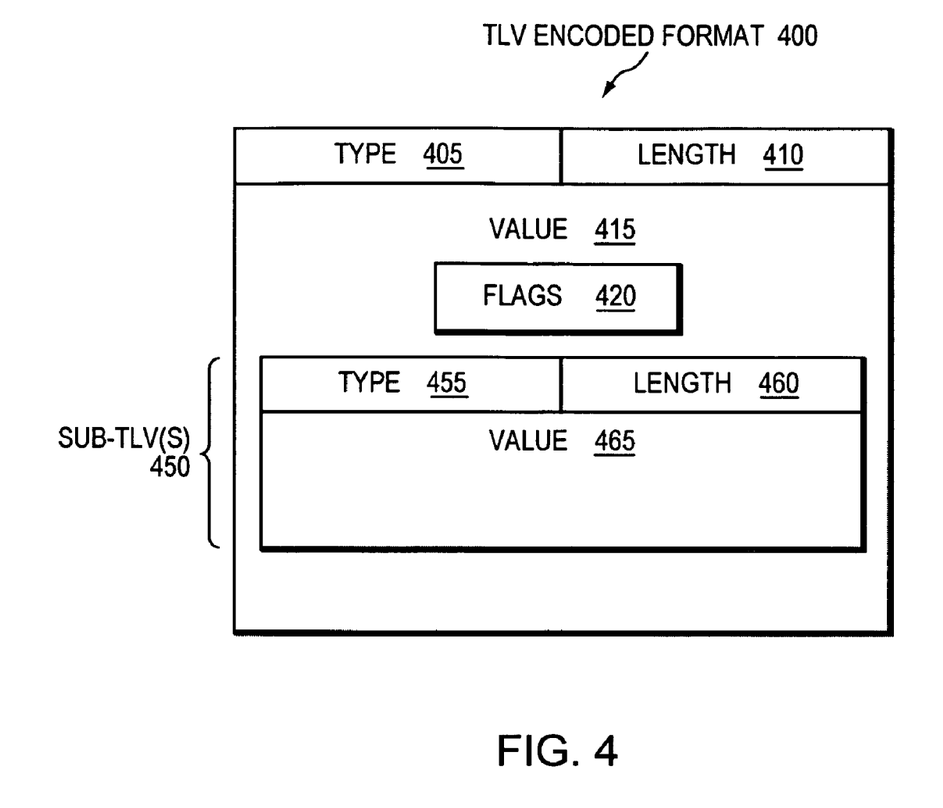
FIG. 4 illustrates an example TLV encoded format.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and one or more novel "notification" fields (e.g., sub-TLVs in a Router Capability/Information TLV), described further below. Generally, the received IGP advertisements are stored in a link state database (LSDB) of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein. Notably, for use with OSPF link state advertisements as IGP advertisements 300, TLVs 400 (e.g., in accordance with the embodiments described herein) may be contained within specific types of advertisements (e.g., Router Information advertisements), or with opaque advertisements, as will be understood by those skilled in the art. The use of IS-IS link state packets, therefore, is merely a representative example.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages in accordance with the embodiments described herein. Further, TE services 248 contain computer executable instructions for implementing TE functions in accordance with the embodiments described herein. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE database (TED, not shown) may be illustratively resident in memory 240 and used to store TE information provided by the routing protocols, such as IGP, BGP, and/or RSVP. The TED may be illustratively maintained and managed by TE services 248.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

Establishment of a tunnel (e.g., TE-LSP) requires computation of a path between a head-end node (LSR) to a tail-end node, signaling along the path, and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node or by some other entity operating as a path computation element (PCE) not co-located on the head-end node.

The head-end node (or a PCE) exploits its knowledge of network topology and resources available on each link to perform the path computation according to the LSP Traffic Engineering constraints. Various path computation methodologies are available including CSPF (constrained shortest path first).

An example tunnel is shown in FIG. 1 as the thick lines with arrows from node A to nodes G and I. Notably, this type of "branching" tunnel is referred to as a "point-to-multipoint" (P2MP) tunnel, originating at one point (head-end node, node A), and terminating at multiple points (tail-end nodes, nodes G and I). Illustratively, the P2MP tunnel may be configured (e.g., computed and established) to receive multicast traffic from a multicast network (multicast 1) at the head-end node (node A), such as, e.g., Video over IP, IPTV, or any other multicast traffic, as will be understood by those skilled in the art. The traffic traverses the P2MP tunnel, is duplicated at node D, and arrives at each of the tail-end nodes (nodes G and I). The tail-end nodes, in turn, may forward the received traffic onto their locally attached multicast networks (multicast 2 and 3, respectively), such as to deliver the content to one or more user/client devices within the multicast networks.

As noted, while failure protection such as Fast Reroute (FRR) may generally be available for intermediate nodes/links of the P2MP tunnel, head-end node failure protection (particularly for a P2MP tunnel receiving multicast traffic) is generally unavailable to service providers. Conventional approaches used to react to head-end node failure are inefficient, requiring excessive time and resources to accommodate the failure, as well as requiring cumbersome (often manual) configuration. Further, resources are inefficiently allocated to multiple P2MP tunnels, particularly where the multiple P2MP tunnels share nodes/links, and/or where one or more of the multiple P2MP tunnels are not even in use.

Head-End Node Failure Protection

According to embodiments of the disclosure, a primary head-end node (PHE) and one or more backup head-end nodes (BHEs) receive traffic from a common (same) multicast network. The PHE establishes a primary point-to-multipoint (P2MP) tunnel and forwards the multicast traffic onto the primary P2MP tunnel. The PHE then notifies a selected BHE of one or more characteristics of the primary P2MP tunnel, and the selected BHE establishes a backup P2MP tunnel with the characteristics of the primary P2MP tunnel. In response to detecting a failure of the PHE, the BHE initiates forwarding of the multicast traffic onto the backup P2MP tunnel.

Operationally, multiple head-end nodes (e.g., nodes A-C, for example, provider edge devices of a service provider's point-of-presence, or POP) receive multicast traffic from a multicast network (multicast 1), such as a LAN. Generally, one of these nodes, the PHE, is selected to actively carry (forward) the multicast traffic into the network 100 over a primary P2MP tunnel to the one or more tail-end nodes (e.g., nodes G and I) to reach receiving multicast networks (multicast 2 and 3, respectively).

Illustratively, head-end nodes that are not selected as the PHE may be configured to provide backup capabilities for the PHE in accordance with one or more embodiments described herein, i.e., as BHEs (e.g., nodes B-C). This backup capability may be advertised within an IGP advertisement/message 300, such as within a novel sub-TLV 450 of an IS-IS Router Capability TLV 400 or a Router Information link state advertisement for OSPF, as will be appreciated by those skilled in the art. In this manner, the PHE may dynamically learn of the one or more BHEs through conventional advertisement propagation. Alternatively, the PHE may be manually configured with possible BHE candidates, or may be configured to assume that nodes/routers in communication with the multicast network (multicast 1) may be BHEs (e.g., learned from IGP advertisements 300), etc.

To select a particular BHE as the backup for the PHE (the "selected BHE"), the PHE may use one or more selection criteria, such as one or more dynamic capabilities of the BHEs, a location of the BHEs, and a degree of sharing between the primary P2MP tunnel and a resultant backup P2MP tunnel from each BHE. For instance, dynamic capabilities of the BHEs (e.g., advertised through TLV extensions 400 within IGP advertisements 300 or through explicit notification, or manually configured at the PHE) may comprise, inter alia, processing ability (e.g., sufficient processing resources to handle two gigabits/second of data), backup availability under certain restrictions (e.g., higher than a certain priority level, only on weekends, only between 7:00 AM and 7:00 PM, etc.). Location, on the other hand, may generally be in relation to the PHE and/or the primary P2MP tunnel. For example, the selected BHE receives the same multicast traffic as the PHE (e.g., from multicast 1). In addition to being interconnected with the multicast network, however, location may also imply that the BHE belongs to one or more particular P2MP groups to which the PHE belongs.

Notably, notifications (e.g., explicit notifications and/or requests/responses described herein) may be exchanged between the PHE and BHEs using IGP advertisements 300 above, or, illustratively, in accordance with a protocol specified in Vasseur, et al., *Path Computation Element (PCE) Communication Protocol (PCEP)-Version 1-<draft-ietf-pce-pcep-03.txt>*, Internet Draft, October 2006, the contents of which are hereby incorporated by reference in their entirety. It should be understood that the use of PCEP serves only as an example, and that other communication protocols may be used in accordance with the present invention.

Figure 5:
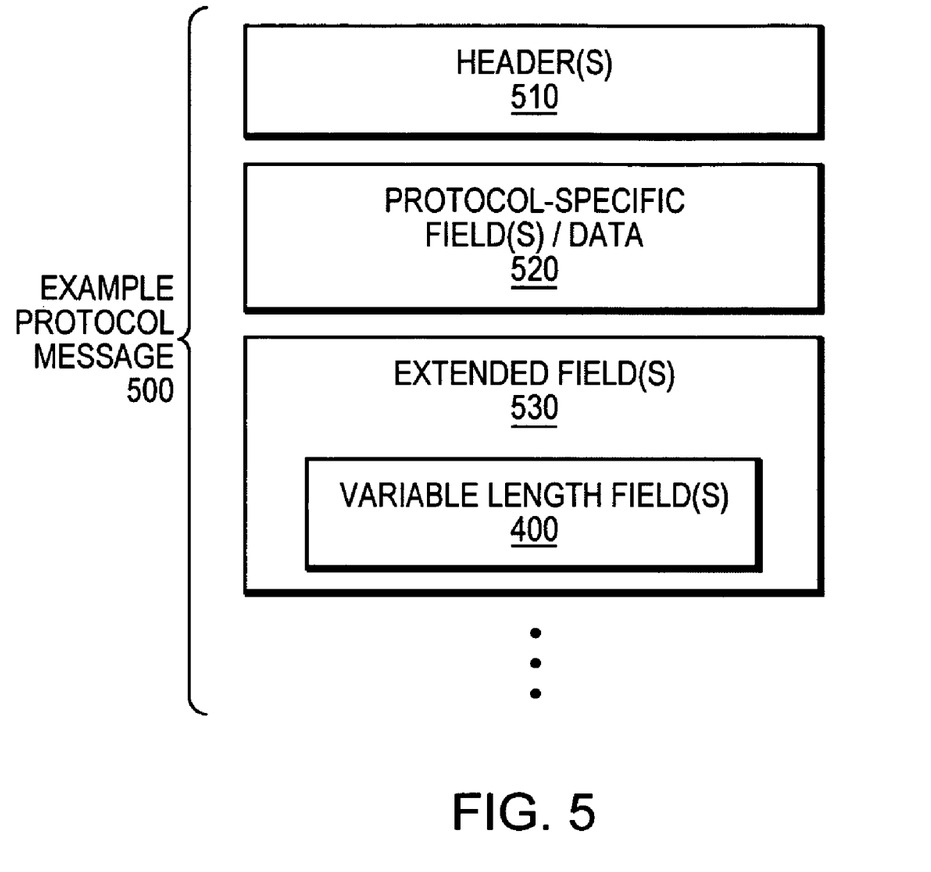
FIG. 5 illustrates a generic protocol message.

FIG. 5 is a schematic block diagram illustrating a generic protocol message 500 that may be transmitted by nodes/routers 200 (PHE and BHEs) according to various protocols in accordance with the embodiments described herein, e.g., a PCEP message 500, etc. Illustratively, the message 500 is shown as a high-level generic message, and those skilled in the art will understand that more specific messages may comprise other fields accordingly. The message 500 includes one or more headers 510, such as an encapsulation protocol header as well as one or more protocol-specific headers (e.g., IP headers, RSVP headers, etc.). As those skilled in the art will understand, the message 500 is sent in an encapsulation appropriate to the environment (e.g., TCP/IP, ATM, MPLS, etc.). Thus, the encapsulation protocol header of headers 510 contains information standard for the specific type of encapsulation. Protocol-specific fields/data 520 may be used to contain protocol-specific information, as will be understood by those skilled in the art. For example, a PCEP message 500 may communicate PCEP-specific information between the PHE and BHEs, accordingly. Regardless of the protocol, the extended field(s) section 530 (e.g., an extension to protocol-specific fields) may include one or more variable length fields (TLVs) 400, to be used in accordance with one or more embodiments described herein.

In addition to dynamic capabilities and location, the BHE may also be selected based on a degree of sharing of trunks between the primary and backup P2MP tunnels. In other words, the PHE may determine an amount of commonality in the P2MP tunnels (trees) by determining a number of links that each P2MP tunnel has in common. The degree of sharing may generally be defined as a number or proportion of shared links between the primary and potential backup P2MP tunnels. Thus, the PHE may compute a P2MP tunnel path on behalf of each BHE to the tail-end nodes of the primary P2MP tunnel (e.g., with characteristics of the primary P2MP tunnel, described below), and may determine the degree of sharing accordingly.

Figure 6:
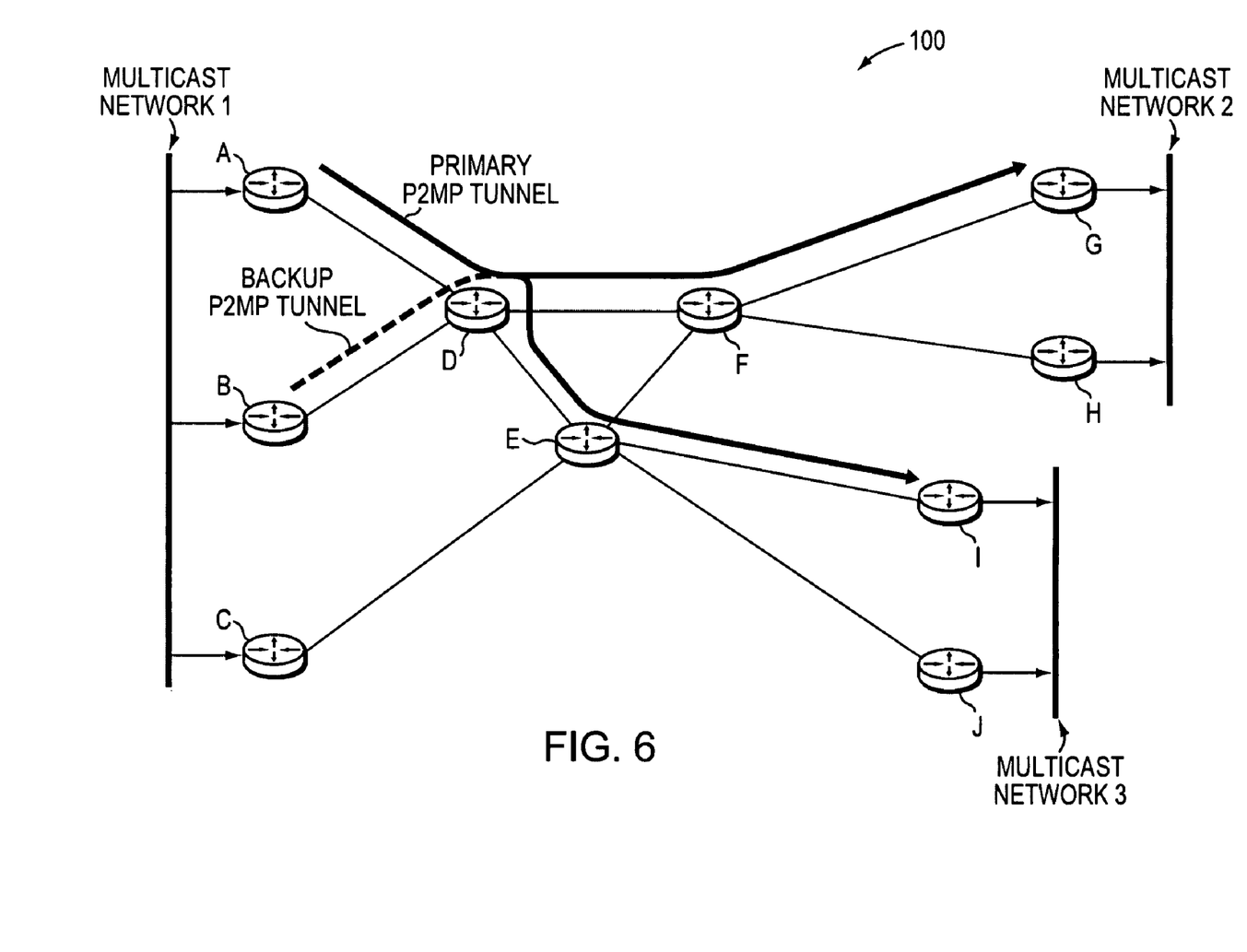
FIG. 6 illustrates the example computer network of FIG. 1 having a computed backup P2MP tunnel.

FIG. 6 illustrates the computer network 100 of FIG. 1 having a computed backup P2MP tunnel in accordance with one or more embodiments described herein. For instance, for one BHE (node B), the PHE (node A) may compute a backup P2MP tunnel to each of the tail-end nodes that traverses a link between node B and node D (shown as the dashed line), then continues along the same path as the primary P2MP tunnel (i.e., "merges" with trunks of the primary P2MP tunnel/tree) to reach tail-end nodes G and I. If a backup P2MP tunnel were computed from node C (not shown), the P2MP tunnel may traverse links between node C and node E (merging to reach node I), and then also between node E and node F (merging to reach node G). Those skilled in the art will appreciate, therefore, that because a backup P2MP tunnel from node B traverses one link different from the primary P2MP tunnel, and a backup P2MP tunnel from node C traverses two links different from the primary P2MP tunnel, it may be determined that the backup P2MP tunnel from node B has a higher degree of sharing with the primary P2MP tunnel. As described below, this sharing feature is beneficial to reduce excess resource reservation through the network 100.

Once the PHE selects a selected BHE (e.g., node B), the PHE notifies the selected BHE that it has been selected. For instance, the notification message (e.g., a PCEP message 500) requests that the selected BHE provide head-end node failure protection in accordance with one or more embodiments described herein, and may include the pre-computed backup P2MP tunnel computed by the PHE above, or a request that the selected BHE compute a backup P2MP tunnel itself. In particular, where the pre-computed backup P2MP tunnel is not included, the PHE informs the BHE of the tail-end nodes (e.g., nodes G and I) to which the backup P2MP tunnel should reach, as well as one or more characteristics of the primary P2MP tunnel that should be maintained in the backup P2MP tunnel. For example, characteristics may comprise, inter alia, required bandwidth, affinities (color, etc.), priority, limitations/constraints, etc. of the primary P2MP tunnel. (Notably, it may also be possible to provide a different set of characteristics for the backup P2MP tunnel, such as lessened constraints, etc., for the backup.) The characteristics may be contained within an extended field 530 of the message 500 (e.g., within a TLV 400). Alternatively, the PHE may also send copy of a Path message (e.g., an RSVP Path message) of primary P2MP tunnel (i.e., used to establish and maintain state of the primary P2MP tunnel) along with the notification (e.g., within PCEP message 500), since the Path message generally contains the characteristics of the primary P2MP tunnel, as will be understood by those skilled in the art.

The selected BHE computes the backup P2MP tunnel from itself to the tail-end nodes based on the characteristics of the primary P2MP tunnel (or other set of backup characteristics, mentioned above). According to one or more embodiments described herein, the selected BHE may also consider the degree of shared trunks (links) between the backup and primary P2MP tunnels. That is, the selected BHE may attempt to maximize a degree of sharing between the two tunnels in order to reduce resource consumption of the network, again, as described below.

Upon computing or receiving the path for the backup P2MP tunnel, the selected BHE may establish the backup P2MP tunnel accordingly (e.g., the dashed line between node B and node D, continuing along the path of the primary P2MP tunnel to the tail-end nodes G and I). Notably, as an enhancement to reduce resource consumption in the network 100 as mentioned above, the backup P2MP tunnel may be established such that shared trunks (links) with the primary P2MP tunnel are not "double booked," i.e., are not reserved twice for the same traffic when only one tunnel will carry the traffic at a given time. For instance, a "shared explicit" (SE) mode in RSVP, as will be understood by those skilled in the art and as described in above-incorporated RFC 3209, may be used during signaling of the backup P2MP tunnel to instruct intermediate nodes along the backup P2MP tunnel (and the primary P2MP tunnel) to not double book the shared resources. In this manner, the additional reserved resources of the backup P2MP tunnel are advantageously limited to the link between nodes B and D.

According to one or more embodiments described herein, the selected BHE (e.g., node B) may notify the PHE as to whether the backup P2MP tunnel has been successfully established, such as with a PCEP message 500. In the event that the selected BHE did not successfully establish the backup P2MP tunnel (or if the selected BHE is unable to comply for other reasons, such as low resources, etc.), the PHE may select a different BHE (e.g., node C) from the available BHEs in accordance with the selection techniques described above.

Once the backup P2MP tunnel is established, the selected BHE (node B) monitors for failure of the PHE (node A). For example, the selected BHE may determine that the PHE has failed in response to a connectivity protocol exchange, such as "keepalive" messages, "hello" messages, "pings" (e.g., ICMP echo requests), a bidirectional forwarding detection (BFD) exchange, an IGP advertisement 300 update, etc., each as will be understood by those skilled in the art. Upon detecting a failure of the PHE, the BHE initiates forwarding of the multicast traffic (from multicast 1) onto the backup P2MP tunnel, thus offering failure protection for the PHE (e.g., FRR protection). The forwarded traffic then continues to reach the tail-end nodes accordingly.

Notably, if the selected BHE is forwarding traffic onto the backup P2MP tunnel (i.e., in response to a PHE failure), and the selected BHE detects that the PHE has "reappeared" (e.g., has come back online, has been repaired, etc.), then the selected BHE may determine whether to maintain forwarding of the multicast traffic or to return the forwarding of the multicast traffic to the PHE. For example, if the PHE has reappeared (e.g., for a configurable length of time, to account for potentially "flapping" nodes/links that fail and reappear frequently), the BHE may determine whether the original PHE is an improvement (e.g., greater capabilities, lower cost, lower cost P2MP tunnel, etc.) over the selected BHE, e.g., by some configurable threshold (e.g., a 10% gain). If so, the BHE may return the forwarding of the multicast traffic to the PHE, such as through a PCEP message 500. Otherwise, the selected BHE continues to forward the traffic onto the backup P2MP tunnel.

Figure 7:
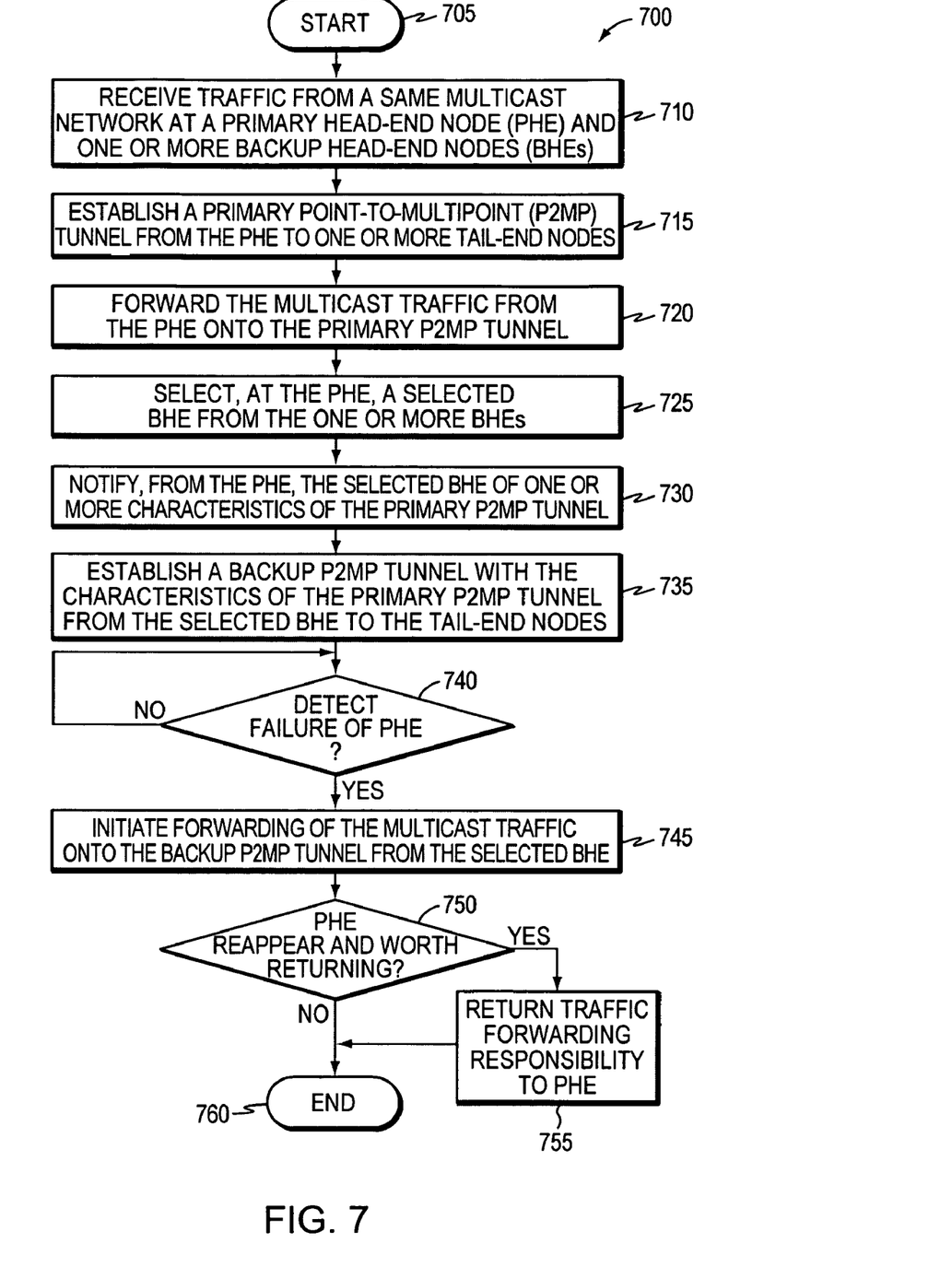
FIG. 7 illustrates an example procedure for protecting against head-end node failure of a P2MP tunnel.

FIG. 7 illustrates an example procedure for protecting against head-end node failure of a P2MP tunnel in accordance with one or more embodiments described herein. The procedure 700 starts at step 705, and continues to step 710, where a PHE (e.g.; node A) and one or more BHEs (e.g., nodes B and C) receive traffic from a same multicast network (e.g., multicast 1). In step 715 a primary P2MP tunnel is established from the PHE to one or more tail-end nodes (e.g., nodes G and I), and the PHE forwards the multicast traffic onto the primary P2MP tunnel in step 720.

As described above, the PHE selects a BHE (e.g., node B) from the available BHEs in step 725, such as based on one or more dynamic capabilities, a location of the BHE, etc. In step 730, the PHE notifies the selected BHE of one or more characteristics of the primary P2MP tunnel (e.g., bandwidth, affinities, etc.), thus requesting that the selected BHE provide head-end node failure protection as mentioned above. In response, the selected BHE establishes a backup P2MP tunnel with the characteristics of the primary P2MP tunnel to the tail-end nodes in step 735. Notably, as described above, the backup P2MP tunnel may be signaled in a "shared explicit" mode, such that the shared trunks with the primary P2MP tunnel are not double booked.

The selected BHE monitors for failure of the PHE (e.g., IGP, BFD, etc.) in step 740, and once failure is detected, the selected BHE initiates forwarding of the multicast traffic onto the backup P2MP tunnel in step 745. If the PHE later reappears and the selected BHE determines that it is worth returning the multicast forwarding responsibility to the PHE (step 750), then the selected BHE returns traffic forwarding responsibility to the PHE in step 755. As a result of either event at step 750, the procedure 700 ends in step 760.

Notably, in the event the PHE selected to transmit the multicast traffic onto a primary P2MP tunnel changes (e.g., in response to network reconfiguration by a system administrator or other non-failure reason), the techniques described above may be performed again to reconfigure a (possibly) new BHE accordingly. Also, if the path of the primary P2MP tunnel changes (e.g., as learned through one or more IGP advertisements 300), a new BHE may be selected and/or a new backup P2MP tunnel may be established if it is determined that the new BHE and/or backup P2MP tunnel would be an improvement (e.g., greater sharing, greater capabilities, etc.) over the original, e.g., by some configurable threshold (e.g., a 10% gain).

Advantageously, the novel techniques described herein protect against head-end node failure of a P2MP tunnel in a computer network. By having a BHE assume the responsibility of a PHE in response to PHE failure, the novel techniques allow for efficient protection of a head-end node, particularly where the PHE and BHE receive the same multicast traffic. In addition, the techniques described above efficiently utilize network resources by attempting to share as many trunks as possible between the backup P2MP tunnel and primary P2MP tunnel, and also by not double booking shared resources. Further, the dynamic aspects of one or more embodiments described herein alleviate the need for cumbersome and inefficient manual configuration.

While there have been shown and described illustrative embodiments that protect against head-end node failure of a P2MP tunnel in a computer network, it is to be understood that various other adaptations and modifications may be made within the spirit and scope of the present invention. For example, the embodiments have been shown and described herein for use with a P2MP tunnel. However, the embodiments of the invention in their broader sense are not so limited, and may, in fact, be used with any head-end node (PHE) of any tunnel (e.g., point-to-point, etc.) that receives the same multicast traffic as one or more other possible head-end nodes (BHEs). Also, while the embodiments above describe one or more protocols and protocol messages, those skilled in the art will appreciate that other protocols and messages may be used accordingly, and that those other protocols and messages are within the scope of the present invention.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   receiving traffic from a multicast network interconnecting a primary head-end node (PHE) to one or more backup head-end nodes (BHEs);
   establishing a primary point-to-multipoint (P2MP) tunnel from the PHE to a plurality of tail-end nodes, the primary P2MP tunnel having one or more characteristics;
   forwarding the multicast traffic from the PHE onto the primary P2MP tunnel;
   selecting a BHE from the one or more BHEs based on a number links that are shared, or a proportion of links that are shared to links that are not shared, between the primary P2MP tunnel and potential backup P2MP tunnels from the one or more BHEs;
   notifying the selected BHE of the characteristics of the primary P2MP tunnel;
   establishing a backup P2MP tunnel from the selected BHE to the plurality of tail-end nodes, the backup P2MP tunnel having at least one of the characteristics of the primary P2MP tunnel; and
   initiating forwarding of the multicast traffic from the selected BHE onto the backup P2MP tunnel in response to detecting a failure of the PHE.

2. The method as in claim 1, further comprising:
   learning of the one or more BHEs at the PHE.

3. The method as in claim 2, further comprising:
   receiving an advertisement from each of the one or more BHEs at the PHE indicating that the BHE is a BHE.

4. The method as in claim 1, further comprising:
   computing the backup P2MP tunnel by considering a number links that are shared, or a proportion of links that are shared to links that are not shared, between the primary and backup P2MP tunnels.

5. The method as in claim 1, further comprising:
   computing the backup P2MP tunnel at the PHE.

6. The method as in claim 5, further comprising:
   sending the computed backup P2MP tunnel from the PHE to the selected BHE.

7. The method as in claim 6, further comprising:
   establishing the computed backup P2MP tunnel at the selected BHE.

8. The method as in claim 5, wherein the step of notifying further comprises:
   notifying the selected BHE of the computed backup P2MP tunnel.

9. The method as in claim 1, further comprising:
   computing the backup P2MP tunnel at the selected BHE based on the one or more characteristics of the primary P2MP tunnel.

10. The method as in claim 1, further comprising:
    notifying the PHE whether the backup P2MP tunnel has been successfully established.

11. The method as in claim 10, further comprising:
    determining that the selected BHE did not successfully establish the backup P2MP tunnel; and, in response, selecting a different BHE from the one or more BHEs as the selected BHE.

12. The method as in claim 1, further comprising:
    establishing the backup P2MP tunnel such that trunks shared with the primary P2MP tunnel are not double booked.

13. The method as in claim 1, further comprising:
    detecting failure of the PHE at the selected BHE in response to bidirectional forwarding detection (BFD) exchange, an Interior Gateway Protocol (IGP) update, or a keepalive message exchange.

14. The method as in claim 1, further comprising:
detecting at the selected BHE that the PHE has reappeared; and
determining whether to maintain forwarding of the multicast traffic from the selected BHE or to return the forwarding of the multicast traffic to the PHE.

15. A method, comprising:
receiving traffic from a multicast network interconnecting a primary head-end node (PHE) to one or more backup head-end nodes (BHEs);
establishing a primary point-to-multipoint (P2MP) tunnel from the PHE to a plurality of tail-end nodes, the primary P2MP tunnel having one or more characteristics;
forwarding the multicast traffic from the PHE onto the primary P2MP tunnel;
selecting a BHE based on one or more dynamic capabilities of the one or more BHEs, the one or more dynamic capabilities including at least one of a processing ability and a backup availability of the one or more BHEs;
notifying the selected BHE of the characteristics of the primary P2MP tunnel;
establishing a backup P2MP tunnel from the selected BHE to the plurality of tail-end nodes, the backup P2MP tunnel having at least one of the characteristics of the primary P2MP tunnel; and
initiating forwarding of the multicast traffic from the selected BHE onto the backup P2MP tunnel in response to detecting a failure of the PHE.

16. A method, comprising:
receiving traffic from a multicast network interconnecting a primary head-end node (PHE) to at least one or more backup head-end nodes (BHEs);
establishing a primary point-to-multipoint (P2MP) tunnel from the PHE to a plurality of tail-end nodes, the primary P2MP tunnel having one or more characteristics;
forwarding the multicast traffic from the PHE onto the primary P2MP tunnel;
selecting a BHE based on a location of the one or more BHEs in relation to the primary P2MP tunnel;
notifying the selected BHE of the characteristics of the primary P2MP tunnel;
establishing a backup P2MP tunnel from the selected BHE to the plurality of tail-end nodes, the backup P2MP tunnel having at least one of the characteristics of the primary P2MP tunnel; and
initiating forwarding of the multicast traffic from the selected BHE onto the backup P2MP tunnel in response to detecting a failure of the PHE.

17. A primary head-end node (PHE), comprising:
one or more network interfaces configured to receive multicast traffic from a multicast network and to forward the multicast traffic onto an established primary point-to-multipoint (P2MP) tunnel to a plurality of tail-end nodes, the primary P2MP tunnel having one or more characteristics;
one or more processors coupled to the network interfaces and configured to execute one or more processes; and
a memory configured to store a head-end failure protection process executable by each processor, the head-end failure protection process when executed to: i) select a backup head-end node (BHE) from one or more BHEs that receive the multicast traffic from the multicast network based on a location of the one or more BHEs in relation to the primary P2MP tunnel, ii) notify the selected BHE of the characteristics of the primary P2MP tunnel, and iii) request that the selected BHE establish a backup P2MP tunnel from the BHE to the plurality of tail-end nodes, the backup P2MP tunnel having the characteristics of the primary P2MP tunnel, and initiate forwarding of the multicast traffic from the BHE onto the backup P2MP tunnel in response to a detected failure of the PHE.

18. The PHE as in claim 17, the failure protection process when executed to also select the BHE from the one or more BHEs based on a number links that are shared, or a proportion of links that are shared to links that are not shared, between the primary and potential backup P2MP tunnels from the one or more BHEs.

19. The PHE as in claim 17, the failure protection process when executed further to determine that the selected BHE did not successfully establish the backup P2MP tunnel, and to select a different BHE from the one or more BHEs as the selected BHE.

20. A backup head-end node (BHE), comprising:
one or more network interfaces configured to receive multicast traffic from a multicast network;
one or more processors coupled to the network interfaces and configured to execute one or more processes; and
a memory configured to store a head-end failure protection process executable by each processor, the head-end failure protection process when executed to: i) receive a notification from a primary head-end node (PHE) of an established primary point-to-multipoint (P2MP) tunnel to a plurality of tail-end nodes, the notification having characteristics of the primary P2MP tunnel, ii) establish a backup P2MP tunnel to the plurality of tail-end nodes in response to the notification, the backup P2MP tunnel having the characteristics of the primary P2MP tunnel, iii) initiate forwarding of the multicast traffic onto the backup P2MP tunnel in response to a detected failure of the PHE iv) detect that the PHE has reappeared, and v) determine whether to maintain forwarding of the multicast traffic onto the backup P2MP tunnel or to return the forwarding of the multicast traffic to the PHE.

21. The BHE as in claim 20, the failure protection process when executed further to compute the backup P2MP tunnel based on the one or more characteristics of the primary P2MP tunnel.

22. The BHE as in claim 20, the failure protection process when executed further to notify the PHE whether the backup P2MP tunnel has been successfully established.

* * * * *

UNITED STATES PATENT AND TRADEMARK OFFICE
CERTIFICATE OF CORRECTION

PATENT NO. : 8,279,749 B2
APPLICATION NO. : 11/604605
DATED : October 2, 2012
INVENTOR(S) : Jean-Philippe Vasseur Page 1 of 1

It is certified that error appears in the above-identified patent and that said Letters Patent is hereby corrected as shown below:

In the Claims:

Col. 12, line 65, Claim 13 should read: "response to a bidirectional forward detection (BFD)"

Signed and Sealed this
Fourth Day of June, 2013

Teresa Stanek Rea
*Acting Director of the United States Patent and Trademark Office*